United States Patent [19]
Remillard et al.

[11] Patent Number: 4,660,361
[45] Date of Patent: Apr. 28, 1987

[54] MOWER WITH TWO SICKLE BARS

[75] Inventors: Rheal Remillard, St. Joseph; Herbert W. Molzahn, Winnipeg, both of Canada

[73] Assignee: MacDon Industries Ltd., Winnipeg, Canada

[21] Appl. No.: 806,472

[22] Filed: Dec. 9, 1985

[51] Int. Cl.⁴ ............................................. A01D 55/02
[52] U.S. Cl. ...................................... 56/297; 56/298; 56/310; 56/259
[58] Field of Search ................. 56/297, 296, 298, 259, 56/275, 307, 308, 310, 311

[56] References Cited

U.S. PATENT DOCUMENTS

| | | | |
|---|---|---|---|
| 1,672,363 | 6/1928 | Brown | 56/297 |
| 3,508,388 | 4/1970 | Buchholz | 56/297 |
| 3,577,716 | 5/1971 | McCarty | 56/297 |
| 4,236,370 | 12/1980 | Shaver | 56/297 |
| 4,246,742 | 1/1981 | Clark et al. | 56/297 |

Primary Examiner—Gene Mancene
Assistant Examiner—John G. Weiss
Attorney, Agent, or Firm—Stanley G. Ade; Adrian D. Battison

[57] ABSTRACT

A mowing device with two sickle bars provides an effective cutting action of the sickle bars at the center where they cooperate in their reciprocation. The knife guards of one sickle bar are mounted at a higher level than those of the other so that one overlaps the other by a height difference slightly greater than the thickness thereof. The central knife guard is of a modified construction so that the end most knife element of the upper sickle bar cooperates with the upper surface of the knife retaining plate member provided for the end knife element of the lower sickle bar. An additional trash bar is provided between the upper plate members for cooperation with the trash bars of the upper sickle bar.

8 Claims, 4 Drawing Figures

MOWER WITH TWO SICKLE BARS

BACKGROUND OF THE INVENTION

This invention relates to a mower with two sickle bars.

Conventional mowers of the type for use for example with a combine or with a swather include a sickle bar which is movable transversely to a frame of the mower across a front edge thereof. The sickle bar carries a plurality of thin knife elements which are triangular in plan and which project forwardly from the sickle bar and slide over a trash bar and between slots defined in knife guards which project forwardly from the trash bar. Each knife guard defines a ledger surface having sharpened shearing edges for cooperating with the knife element and includes a knife element retaining plate parallel to and overlying the ledger surface so as to define the slot through which the knife element moves.

The amount of reciprocation of the sickle bar is of course sufficient move each knife element across the frame from a position within one knife guard to a position within the next adjacent knife guard. Thus each movement acts to create a cutting action between the knife element and the knife guard as it moves into the slot defined by the knife guard.

In many cases the mower element or frame is of limited width so that a single sickle bar can extend from one end to the other end and be driven at one of the ends for reciprocation back and forth.

In other cases, and particularly in more recent years as the width of such mower devices has increased, it has been found necessary to provide two such sickle bars extending inwardly from respective ends to a mid position. Such an arrangment including two sickle bars can reduce the forces involved on the drive mechanisms in comparison with the forces on a single sickle bar of double length. In addition, the two sickle bars can be driven in opposite phase so as to reduce vibration caused by the reciprocating mass.

However, a problem arises in an arrangement of this type in that the sickle bars and knife elements must be arranged to cooperate in some way at the mid position to properly cut the crop at that position while of course avoiding any mechanical contact between the sickle bars and moving elements. It will of course be appreciated that the cutting of the crop at the mid position must continue effectively normally otherwise plugging of the mower at this section can occur.

Various prior proposals have been made for overcoming this problem and perhaps the most simple is shown in U.S. Pat. No. 3,771,297 which shows a divider plate at the central section which is intended to direct the crop away of the central section.

Another arrangement is disclosed in U.S. Pat. No. 3,508,388 in which there is provided an extra wide ledger surface and effectively the knife elements at the inboard end of each sickle bar are formed by half elements so that the two bars effectively abut at the inward end of the stroke with the inboard cutting edge being defined by a straight for and aft edge in place of the conventional inclined side edge of the triangular knife elements.

A yet further type of arrangement is disclosed in U.S. Pat. Nos. 3,577,716 and 4,236,370 in which an extension piece is attached to one end of one of the sickle bars and extends over a gap between the inboard ends so as to provide a cutting effect in that gap. These arrangements are complicated and require a number of different knife elements thus complicating the replacement part situation.

A yet further design is used on designs manufactured by the Hesston Company in which the inboard ends are arranged so that one slides on the other with the knife elements at those ends being modified to provide a cutting effect. This again is a complicated arrangement using different knife elements and having a reduced or less effective cutting action at the center section.

SUMMARY OF THE INVENTION

It is one object of the present invention, therefore, to provide a further arrangement of mowing device including two sickle bars of this general type in which the cutting action at the center or mid position is equally effective to that at other sections and in which the knife elements are all the same thus enabling ready replacement.

According to a first aspect of the invention, therefore, there is provided a mowing device comprising a frame structure arranged for foward travel over ground having a standing crop thereon, a cutter support bar secured to and extending transversely across a front end of said frame structure, a plurality of knife guards mounted in spaced relation along said support bar and projecting forwardly therefrom in transverse alignment, each of said guards having an upwardly facing ledger surface with opposed side edges thereof sharpened to provide first and second shearing edges, a first and a second sickle bar, means mounting the sickle bars in transversely extending position for reciprocating movement relative to said knife guards in opposed phase, inboard ends of said bars terminating in generally end to end relationship adjacent a mid position of said cutter support bar such that the relative positions of such inboard ends vary during said reciprocating movement, a plurality of knife elements mounted on each of said sickle bars for movement therewith and having cutting edges arranged to cooperate with said shearing edges of said knife guards; said sickle bars and cooperating knife guards being arranged at said inboard ends thereof such that the first is higher than the second by distance greater than the vertical thickness of the sickle bar such that the first sickle bar can overlap the second sickle bar with at least one knife element of the first sickle bar passing over at least one knife element of said second sickle bar, at least one knife guard at said mid position having a lower ledger surface for cooperation with said at least one knife element of said second sickle bar and an upper ledger surface for cooperating with said at least one knife element of said first sickle bar.

According to a second aspect of the invention, therefore, there is provided a mowing device comprising a frame structure arranged for forward travel over ground having a standing crop thereon, a cutter support bar secured to and extending transversely across a front end of the frame structure, a plurality of knife guards mounted in spaced relation along said support bar and projecting forwardly therefrom in transverse alignment, said guards being formed in respective pairs, each pair defining a pair of upwardly facing ledger surfaces with opposed side edges thereof sharpened to provide first and second shearing edges and an upper surface of a trash bar interconnecting said ledger surfaces, means defining a channel rearwardly of said trash bar, a first and a second sickle bars, means mounting the sickle bars in transversely extending positions for reciprocating movement relative to said knife guards in said channel means thereof in opposed phase, inboard ends of said sickle bars terminating in generally end to end relationship adjacent a mid position of said cutter support bar such that the relative positions of said inboard ends vary during said reciprocating movement, a plurality of knife elements mounted on each of said sickle bars for sliding movement over the upper ledger surfaces and the upper surface of the trash bar, each of said knife elements having side cutting edges arranged to cooperate with said shearing edges of said knife guards, said sickle bars and cooperating knife guards being arranged at said inboard ends thereof such that the first sickle bar is higher than the second sickle bar at said inboard end by a distance greater than the vertical thickness of the first sickle bar such that the first can overlap the second with at least one knife element thereof passing directly over at least one knife element of said second sickle bar, and one pair of knife guards at said mid position being modified relative to the remainder of the knife guards by the provision of an upper ledger surface for cooperation with said at least one knife element of said first sickle bar and a lower ledger surface for cooperation with said at least one knife element of said second sickle bar, and a trash bar having an upper surface contiguous with the upper ledger surface and extending from said knife guard to the other knife guard of the pair.

Effectively, therefore, the sickle bars and associated knife elements are common along the length of the sickle bars without any modified parts and basically the knife guards are themselves the same for both sickle bars except that those for the first are arranged on a higher level than those of the second by a distance slightly greater than the thickness of the sickle bar.

Only a central knife guard arranged as a pair of such guards is a unique item. The central knife guard is therefore modified by the particular arrangement of trash bars and also by the fact that the upper surface of the conventional knife element guide plate which defines a slot with the ledger surface has an upper surface thereof which is machined to provide second ledger surface for the innermost knife element of the upper or first sickle bar.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
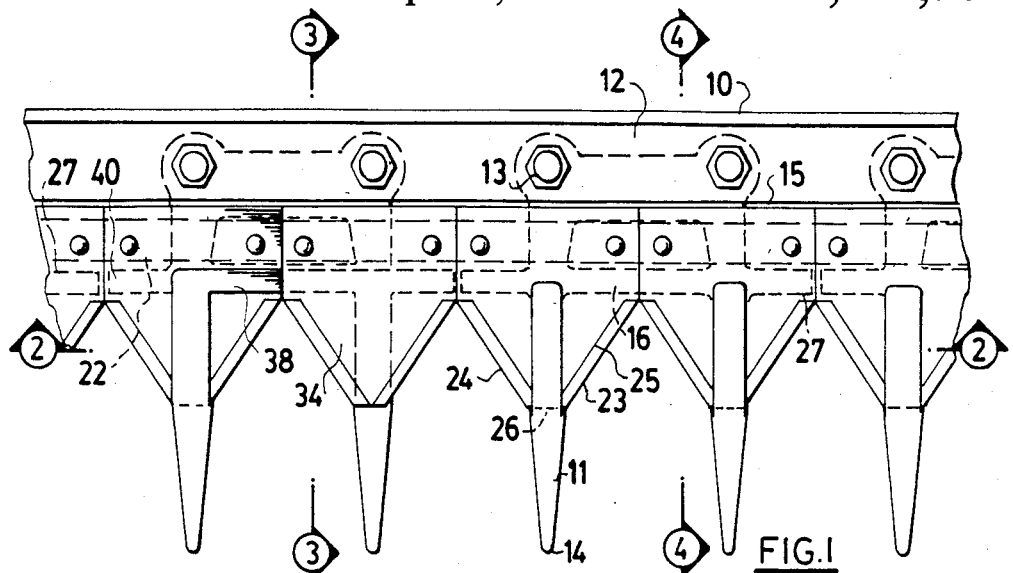
FIG. 1 is a plan view of a center section of a mowing device with two sickle bars overlapping at the center section.

A mowing device comprises a frame 10 which is shown only in part since the remainder of the frame, its support on a suitable machine and its support from the ground will of course be apparent to one skilled in the art and variable dependent upon requirements. The frame carries a plurality of knife guards 11 each of which is generally of conventional construction and comprises a pair of such guards formed as an integral casting for attachment to the frame 10 at a flange 12 by bolts 13.

Each knife guard comprises a forwardly projecting elongate member defining a nose 14 for engaging into a standing crop on the ground over which the frame is transported. The elongate member or finger is coupled to the adjacent elongate member or finger by a pair of transverse bars 15 and 16 so that the fingers project forwardly in alignment and rigidly supported relative to one another on the pair of bolts 13.

Each finger defines an upper ledger surface 17 which is machined to define a flat horizontal surface over which the knife elements slide. Immediately above the ledger surface 17 is provided a knife element guide plate 18 forming a slot between the surface 17 and the plate 18 which retains the knife elements in position for longitudinal reciprocating movement as explained hereinafter.

The bars 15 and 16 provide upper surfaces 19 and 20 which lie in the same horizontal plane as the surface 17 for guiding the knife elements in their longitudinal movement. In between the bars 15 and 16 is positioned a channel 21 for receiving a sickle bar 22 extending across the full width of the mower from each pair of knife guards to the next. On top of the sickle bar is bolted a plurality of knife elements 23 each of which extends forwardly and rearwardly of the sickle bar 22 for resting upon the surfaces 19 and 20 thus providing a bearing for the longitudinal movement. Forwardly of the surface 20, the knife elements converge to define side edges 24 and 25 and a front joining edge 26. The edges 24 and 25 are sharpened to form a sharp edge in the plane of the underside of the knife element so that the sharp edge can cooperate with sharpened edges along the sides of the surface 17 to provide a cutting action.

The bar 16 extends across between the two fingers in front of the sickle bar and acts as a trash bar for engaging and sweeping trash away from the moving sickle bar. Trash bar portions also extend outwardly on either side of the fingers as indicated at 27 with the trash bar portion 27 of one pair of fingers engaging the similar trash bar portion of the next adjacent fingers or knife guards so that the trash bar extends as a continuing bar across the full length of the sickle bar 22.

Figure 2:
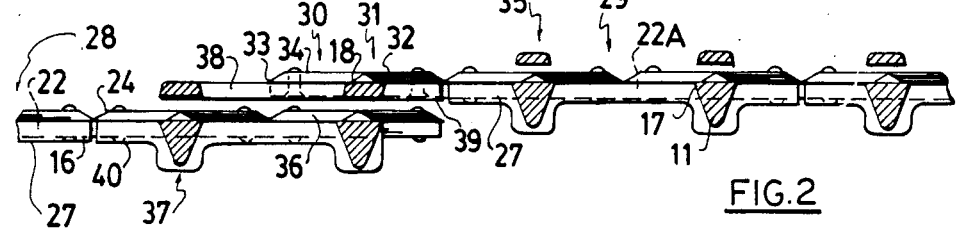
FIG. 2 is a cross sectional view along the lines 2—2 of FIG. 1.
Figure 3:
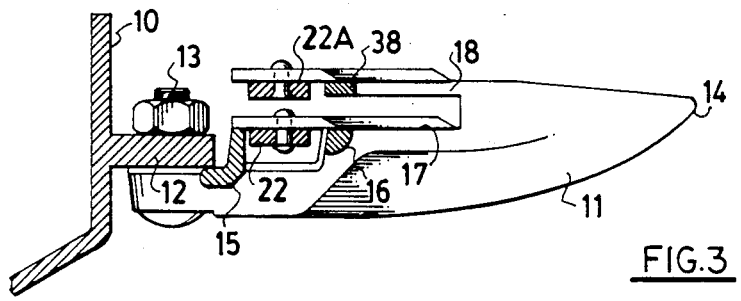
FIG. 3 is a cross sectional view along the lines 3—3 of FIG. 1
Figure 4:
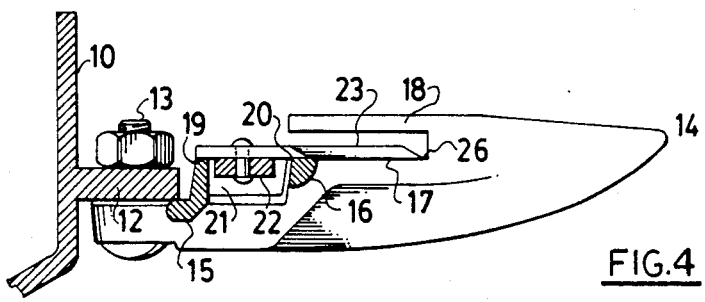
FIG. 4 is a cross sectional view taken along the lines 4—4 of FIG. 1.

Turning now to FIGS. 2 and 3, the arrangement according to the invention is shown in most detail wherein the left and right hand sickle bars are arranged to overlap at the center section to provide effective cutting action at that overlapping portion. Thus the left hand sickle bar 22 is arranged to underly the right hand sickle bar indicated at 22A. The left hand sickle bar as shown in FIG. 2 cooperates with an innermost conventional knife guard generally indicated at 28 and similarly the right hand sickle bar cooperates with an inner most conventional knife guard generally indicated at 29. It will be noted that the knife guard 29 is mounted on a higher level than the knife guard 28 so as to guide the sickle bar 22A in the overlapping arrangement. The spacing between the sickle bars 22 and 22A is arranged to be slightly greater than the thickness thereof so that one can readily pass over the other.

The central knife guard pair generally indicated at 30 is modified according to the invention to accommodate the overlapping sickle bars 22 and 22A. Thus particularly the right hand finger or knife guard indicated at 31 is modified by the formation on an upper surface of the guide plate 18 thereof of a second ledger surface parallel to the first ledger surface indicated at 17 for receiving the knife elements of the sickle bar 22A. Thus a shearing edge is formed at the longitudinal edge 32 of the plate 18 for cooperation with the edge indicated at 33 of the end most knife element indicated at 34. It will be appreciated that the view shown in FIGS. 2 and 3 is taken when the sickle bars are at their innermost or overlapping positions and they take up a position in the outermost end of the reciprocating stroke in which the end knife element 34 lies in contact with the knife guard indicated at 35 and similarly the knife element indicated at 36 of the sickle bar 22 moves outwardly to the knife guard indicated at 37.

The central knife guard 30 is also modified by the provision of a second trash bar indicated at 38 interconnecting the guide plate 18 of the knife guard 31 with the guide plate 18 of the knife guard 37. In addition a trash bar portion 39 extend outwardly to the opposite side of the knife guard 31 for cooperation with the trash bar portion 27 of the knife guard 35. Furthermore a trash bar portion 40 extends outwardly from the opposite side of the knife guard 37 for cooperation with the trash bar portion 27 of the knife guard pair 28. The opposed corners of the knife guard pair 30 are free from trash bar portions since these are not required.

It will be appreciated therefore that the sickle bars 22 and 22A are basically of conventional unmodified form with therefore conventional replacement parts. The modifications to allow the overlap of the sickle bars are provided by a special central knife guard 30 and the positioning of the knife guards of the sickle bars to provide the height difference enabling the overlap. The cutting action at the center also remains equally as effective as that at other positions of the mowing device in view of the cutting action between the edge 33 of the knife element 34 and the edge 32 and also the cutting action between the edge of the knife element 36 and the surface 17 of the knife guard 31.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A mowing device comprising a frame structure arranged for forward travel over ground having a standing crop thereon, a cutter support bar secured to an extending transversely across a front end of said frame structure, a plurality of knife guards mounted in spaced relation along said support bar and projecting forwardly therefrom in transverse alignment, each of said guards having an upwardly facing ledger surface with opposed side edges thereof sharpened to provide first and second shearing edges, a first and a second sickle bar, means mounting the sickle bars in transversely extending position for reciprocating movement relative to said knife guards in opposed phase, inboard ends of said bars terminating in generally end to end relationship adjacent a mid position of said cutter support bar such that the relative positions of said inboard ends vary during said reciprocating movement, a plurality of knife elements mounted on each of said sickle bars for movement therewith and having cutting edges arranged to cooperate with said shearing edges of said knife guards, said sickle bars and cooperating knife guards being arranged at said inboard ends thereof such that the first is higher than the second by distance greater than the vertical thickness of the sickled bar such that the first sickle bar can overlap the second sickle bar with at least one knife element of the first sickle bar passing over at least one knife element of said second sickle bar, at least one knife guard at said mid position having a lower ledger surface for cooperation with said at least one knife element of said second sickle bar and an upper ledger surface for cooperating with said at least one knife element of said first sickle bar.

2. The invention according to claim 1 wherein each of said knife guards includes a knife element retaining plate member overlying said ledger surface so as to define therewith a slot within which the knife elements are confined for said reciprocating movement, and wherein said mid position knife guard has said upper ledger surface formed on an upper surface of said plate member.

3. The invention according to claim 1 wherein only one side edge of said upper ledger surface is sharpened to define a shearing edge.

4. The invention according to claim 1 wherein the upper ledger surface of said mid position knife guard is defined by an upper most surface thereof.

5. The invention according to claim 1 wherein each of said knife guards includes a trash bar extending outwardly to respective sides thereof at a position beneath the knife element and forwardly of the sickle bar and arranged in end to end engagement with the trash bars of adjacent knife guards to provide a continuous bar across the front of said sickle bar and wherein said mid position knife guard has a trash bar extending outwardly from one side of the upper ledger surface for cooperation with a trash bar of the adjacent knife guard of the first sickle bar and a trash bar extending outwardly from an opposed side of the lower ledger surface for cooperating with a trash bar of the adjacent knife guard of the second sickle bar.

6. The invention according to claim 1 wherein the knife guards are formed in pairs with a rearwardly extending flange portion thereof for attachment to said cutter support bar, means defining a channel for receiving a respective one of said sickle bars, a trash bar extending transversely between the ledger surfaces of said pair and outer trash bar portions extending outwardly from outer sides of said ledger surfaces, and wherein said mid position knife guard is formed as one of a pair of such guards with said pair modified relative to said knife guards by a second trash bar interconnecting said upper ledger surface to a knife element retaining plate member of the other of said pair and an outer trash bar portion extending outwardly from said upper ledger surface to an outer trash bar portion of an adjacent knife guard of the first sickle bar.

7. The invention according to claim 6 wherein the mid position knife guard is free from an outer trash bar portion at said lower ledger surface on the side thereof adjacent said first sickle bar.

8. A mowing device comprising a frame structure arranged for forward travel over ground having a standing crop thereon, a cutter support bar secured to and extending transversely across a front end of the frame structure, a plurality of knife guards mounted in spaced relation along said support bar and projecting forwardly therefrom in transverse alignment, said guards being formed in respective pairs, each pair defining a pair of upwardly facing ledger surfaces with opposed side edges therof sharpened to provide first and second shearing edges and an upper surface of a trash bar interconnecting said ledger surfaces, means defining a channel rearwardly of said trash bar, a first and a second sickle bars, means mounting the sickle bars in a transversely extending positions for reciprocating movement relative to said knife guards in said channel means thereof in opposed phase, inboard ends of said sickle bars terminating in generally end to end relationship adjacent a mid position of said cutter support bar such that the relative positions of said inboard ends vary during said reciprocating movement, a plurality of knife elements mounted on each of said sickle bars for sliding movement over the upper ledger surfaces and the upper surface of the trash bar, each of said knife elements having side cutting edges arranged to cooperate with said shearing edges of said knife guards, said sickle bars and cooperating knife guards being arranged at said inboard ends thereof such that the first sickled bar is higher than the second sickle bar at said inboard end by a distance greater than the vertical thickness of the first sickle bar such that the first can overlap the second with at least one knife element thereof passing directly over at least one knife element of said second sickle bar, and one pair of knife guards at said mid position being modified relative to the remainder of the knife guards by the provision of an upper ledger surface for cooperation with said at least one knife element of said first sickle bar and a lower ledger surface for cooperation with said at least one knife element of said second sickle bar, and a trash bar having an upper surface contiguous with the upper ledger surface and extending from said knife guard to the other knife guard of the pair.

* * * * *